(12) United States Patent
Suzuki et al.

(10) Patent No.: US 9,440,860 B2
(45) Date of Patent: Sep. 13, 2016

(54) TRIMANGANESE TETRAOXIDE AND ITS PRODUCTION PROCESS

(71) Applicant: TOSOH CORPORATION, Yamagushi (JP)

(72) Inventors: Naoto Suzuki, Yamaguchi (JP); Takahiro Matsunaga, Yamaguchi (JP)

(73) Assignee: TOSOH CORPORATION, Yamaguchi (JP)

( * ) Notice: Subject to any disclaimer, the term of this patent is extended or adjusted under 35 U.S.C. 154(b) by 0 days.

(21) Appl. No.: 14/432,042

(22) PCT Filed: Oct. 3, 2013

(86) PCT No.: PCT/JP2013/076975
§ 371 (c)(1),
(2) Date: Mar. 27, 2015

(87) PCT Pub. No.: WO2014/054750
PCT Pub. Date: Apr. 10, 2014

(65) Prior Publication Data
US 2015/0266748 A1    Sep. 24, 2015

(30) Foreign Application Priority Data
Oct. 3, 2012 (JP) .................................. 2012-221628

(51) Int. Cl.
*C01G 45/02* (2006.01)
*C01G 45/12* (2006.01)
*H01M 4/505* (2010.01)

(52) U.S. Cl.
CPC ........... *C01G 45/02* (2013.01); *C01G 45/1242* (2013.01); *C01P 2002/32* (2013.01); *C01P 2002/50* (2013.01); *C01P 2002/52* (2013.01); *C01P 2004/61* (2013.01); *C01P 2006/11* (2013.01); *C01P 2006/12* (2013.01); *C01P 2006/14* (2013.01); *C01P 2006/16* (2013.01); *H01M 4/505* (2013.01); *Y02E 60/122* (2013.01); *Y02P 70/54* (2015.11)

(58) Field of Classification Search
CPC ......... C30B 7/12; C30B 29/16; C30B 30/02; C01G 45/1221; C01G 45/02; H01M 4/505; H01M 4/523; H01M 4/525; B82Y 30/00; Y10T 428/2982; C01P 2002/32; C01P 2006/12; C01P 2006/40; C01P 2006/16; C01P 2006/80; C01P 2004/64; C01P 2004/61; C01P 2006/11; C01P 2004/03; C01P 2006/14
See application file for complete search history.

(56) References Cited

U.S. PATENT DOCUMENTS

| 9,150,427 B2* | 10/2015 | Iwata ..................... C01G 45/02 |
| 2013/0187083 A1 | 7/2013 | Iwata et al. |
| 2015/0104373 A1 | 4/2015 | Iwata et al. |
| 2015/0104644 A1 | 4/2015 | Iwata et al. |

FOREIGN PATENT DOCUMENTS

| CN | 1365949 | 8/2002 |
| CN | 1644513 | 7/2005 |
| CN | 1814551 | 8/2006 |
| CN | 1935673 | 3/2007 |
| JP | 2000-7341 | 1/2000 |
| JP | 2001-261343 | 9/2001 |
| JP | 2003-86180 | 3/2003 |
| JP | 2011-251862 | 12/2011 |
| JP | 2012-23015 | 2/2012 |
| WO | 2012/046735 | 4/2012 |

OTHER PUBLICATIONS

U.S. Appl. No. 14/386,480 to Takahiro Matsunaga et al., filed Sep. 19, 2014.
Search report from PCT/JP2013/076975, mail date is Jan. 7, 2014.
International Preliminary Report on Patentability in PCT/JP2013/07695, issued Oct. 3, 2012.

* cited by examiner

*Primary Examiner* — Anthony J Zimmer
(74) *Attorney, Agent, or Firm* — Greenblum & Bernstein, P.L.C.

(57) ABSTRACT

To provide trimanganese tetraoxide from which a lithium manganese oxide with less fusion of particles by firing, i.e. necking phenomenon, is obtained. Trimanganese tetraoxide characterized in that the pore volume of pores having 5 pore diameters of from 0.3 to 2 μm is at least 0.1 mL/g. The pore volume of pores having pore diameters of from 0.5 to 1 μm is preferably at least 0.03 mL/g.

12 Claims, 1 Drawing Sheet

TRIMANGANESE TETRAOXIDE AND ITS PRODUCTION PROCESS

TECHNICAL FIELD

The present invention relates to trimanganese tetraoxide used as e.g. a material of a lithium manganese oxide. More particularly, it relates to trimanganese tetraoxide from which a lithium manganese oxide with less fusion of particles by firing is obtained.

BACKGROUND ART

Trimanganese tetraoxide is converted to a lithium manganese oxide by being mixed with a lithium material and another metal material, followed by firing. For example, rhombic $LiMnO_2$ obtained by mixing and grinding trimanganese tetraoxide and lithium hydroxide, followed by firing, has been reported (Patent Document 1). Further, a lithium nickel manganese cobalt composite oxide obtained by forming trimanganese tetraoxide, lithium carbonate, cobalt oxyhydroxide, nickel hydroxide and the like into a slurry, and wet grinding the slurry, followed by firing, has been reported (Patent Document 2).

In such processes for producing a lithium manganese oxide using trimanganese tetraoxide, a so-called necking phenomenon i.e. a phenomenon such that particles of the lithium manganese oxide are fused with one another during firing is likely to occur. Due to the necking phenomenon, the lithium manganese oxide obtained by such a production process tends to be non-uniform in its particle size, particle shape, etc.

In order to make such a non-uniform lithium manganese oxide be uniform, it is necessary to grind or pulverize the lithium manganese oxide after firing (Patent Documents 1 and 2).

However, in a case where grinding or pulverization is carried out after firing, not only the production cost of the lithium manganese oxide is increased but also problems are pointed out that abrasion powder from the grinding medium may be included (for example, Patent Document 3).

PRIOR ART DOCUMENTS

Patent Documents

Patent Document 1: JP-A-2003-086180
Patent Document 2: JP-A-2012-023015
Patent Document 3: JP-A-2000-007341

DISCLOSURE OF INVENTION

Technical Problem

In the process for producing a lithium manganese oxide, which comprises grinding or pulverizing the lithium manganese oxide after firing, as disclosed in Patent Document 1 or 2, not only a cost increase and inclusion of the abrasion powder occur but also fine particles of the lithium manganese oxide will generate. If the fine particles are present, when such a lithium manganese oxide is used as a cathode active material of a lithium ion battery, elution of manganese is likely to occur.

The fine particles may be removed by particle size adjustment such as classification. However, if classification is carried out after grinding, not only the yield of an obtainable lithium manganese oxide is lowered but also an additional production process is necessary, thus leading to a further increase in the production cost.

Conventional production processes using trimanganese tetraoxide as a material have such problems resulting from the necking phenomenon, and such problems are more remarkable as the production scale is larger.

The object of the present invention is to overcome such problems and to provide trimanganese tetraoxide from which a lithium manganese oxide with less fusion of particles by firing, that is, with less necking phenomenon.

Solution to Problem

Under these circumstances, the present inventors have conducted extensive studies and as a result, found that the volume of pores of trimanganese tetraoxide affects fusion behavior of lithium manganese oxide particles by firing. They have further found that the necking phenomenon can be suppressed by controlling pores having pore diameters within a specific range of trimanganese tetraoxide.

That is, the present invention provides the following.

(1) Trimanganese tetraoxide characterized in that the pore volume of pores having pore diameters of from 0.3 to 2 µm is at least 0.1 mL/g.

(2) The trimanganese tetraoxide according to the above (1), wherein the pore volume of pores having pore diameters of from 0.5 to 1 µm is at least 0.03 mL/g.

(3) The trimanganese tetraoxide according to the above (1) to (2), wherein the most frequent pore size is from 2 to 4.5 µm.

(4) The trimanganese tetraoxide according to any one of the above (1) to (3), wherein the specific surface area is from 2.5 to 9 $m^2/g$.

(5) The trimanganese tetraoxide according to any one of the above (1) to (4), wherein the average particle size is from 8 to 20 µm.

(6) A process for producing the trimanganese tetraoxide as defined in any one of the above (1) to (5), which comprises a crystallization step of crystallizing trimanganese tetraoxide from a manganese salt aqueous solution not by means of manganese hydroxide, wherein in the crystallization step, the manganese salt aqueous solution and an alkali solution are mixed to obtain a slurry in which trimanganese tetraoxide is crystallized, and the trimanganese tetraoxide is crystallized so that the solid content concentration of the trimanganese tetraoxide in the slurry is higher than 2 wt % and the average retention time of the trimanganese tetraoxide in the slurry is at most 10 hours.

(7) The process for producing the trimanganese tetraoxide according to the above (6), wherein in the crystallization step, the oxidation-reduction potential is from 100 to 300 mV.

(8) A process for producing the trimanganese tetraoxide as defined in any one of the above (1) to (5), which comprises a crystallization step of crystallizing trimanganese tetraoxide from a manganese salt aqueous solution not by means of manganese hydroxide, wherein in the crystallization step, the manganese salt aqueous solution and an alkali solution are mixed to obtain a slurry in which trimanganese tetraoxide is crystallized, and the trimanganese tetraoxide is crystallized so that the solid content concentration of the trimanganese tetraoxide in the slurry is at most 2 wt %.

(9) The process for producing the trimanganese tetraoxide according to the above (8), wherein the trimanganese tetraoxide is crystallized so that the average retention time of the trimanganese tetraoxide in the slurry is at most 10 hours.

(10) The process for producing the trimanganese tetraoxide according to the above (8) or (9), wherein in the crystallization step, the oxidation-reduction potential is from −100 to 200 mV.

(11) A process for producing a lithium manganese oxide, which comprises a mixing step of mixing the trimanganese tetraoxide as defined in any one of the above (1) to (5) with at least one of lithium and a lithium compound, and a heating step of subjecting the mixture to heat treatment.

Advantageous Effects of Invention

According to the present invention, it is possible to provide trimanganese tetraoxide from which a lithium manganese oxide with less fusion of particles by firing is obtained, and its production process.

According to the trimanganese tetraoxide of the present invention, it is possible to provide a lithium manganese oxide which requires no grinding step nor pulverization step after firing and its production process, and further, a lithium manganese oxide with a low production cost as compared with a conventional product and its production process.

According to the trimanganese tetraoxide of the present invention, it is easy to control the particle size of a lithium manganese oxide obtainable by using it as a material.

DESCRIPTION OF EMBODIMENTS

Figure 1:
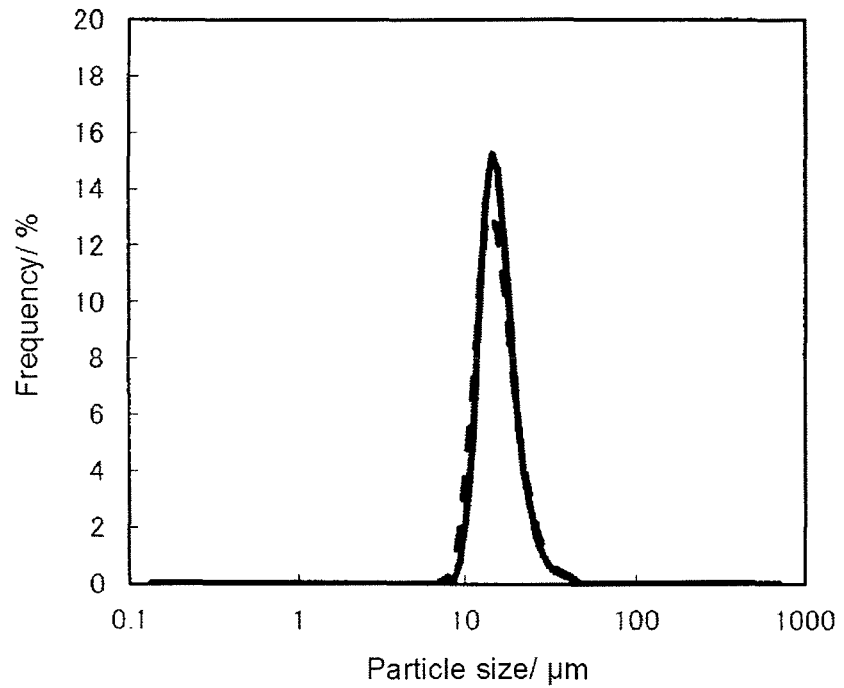
FIG. 1 illustrates particle size distributions of trimanganese tetraoxide and lithium manganate in Example 2 (solid line: trimanganese tetraoxide, broken line: lithium manganate).
Figure 2:
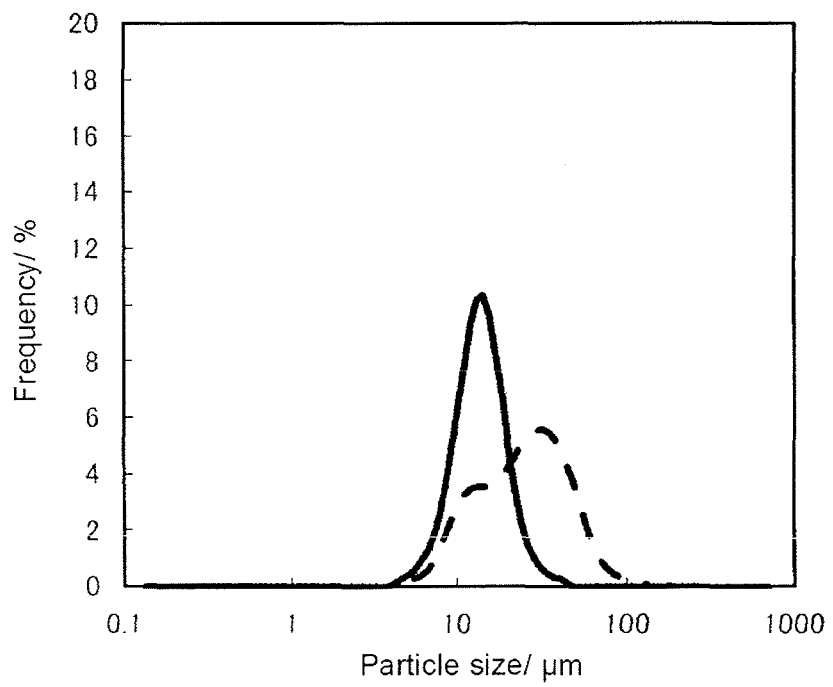
FIG. 2 illustrates particle size distributions of trimanganese tetraoxide and lithium manganate in Comparative Example 2 (solid line: trimanganese tetraoxide, broken line: lithium manganate).

Now, the trimanganese tetraoxide of the present invention will be described.

Of the trimanganese tetraoxide of the present invention, the pore volume of pores having pore diameters of from 0.3 to 2 μm is at least 0.1 mL/g, preferably at least 0.2 mL/g, more preferably at least 0.21 mL/g, further preferably at least 0.24 mL/g. If the pore volume of the pores having diameters of from 0.3 to 2 μm is less than 0.1 mL/g, fusion of particles of a lithium manganese oxide obtainable by using such a trimanganese tetraoxide as the material (hereinafter sometimes referred to simply as "fusion") is likely to occur. If fusion occurs, not only the particle shape of the obtainable lithium manganese oxide tends to be non-uniform but also the average particle size tends to be large. Such a lithium manganese oxide should be subjected to a grinding step or a pulverization step after firing.

The larger the pore volume of pores having pore diameters of from 0.3 to 2 μm, the more the fusion tends to be suppressed. On the other hand, although the upper limit of the pore volume of such pores is optional, the pore volume of the pores having pore diameters of from 0.3 to 2 μm may be at most 0.5 mL/g, further at most 0.4 mL/g, still further at most 0.3 mL/g.

The pore volume may be measured by a conventional mercury intrusion technique. Further, the pore diameter is a diameter of a pore assuming that the pore is cylindrical in the mercury intrusion technique.

The pore volume of pores having pore diameters of less than 0.3 μm has substantially no influence over the fusion. In addition, the pore volume of pores having pore diameters of less than 0.3 μm has small influence over the fillability of the trimanganese tetraoxide. Thus, in the trimanganese tetraoxide of the present invention, pores having pore diameters of less than 0.3 μm may be present. The pore volume of pores having pore diameters of less than 0.3 μm may be at least 0.001 mL/g and at most 0.02 mL/g, further at least 0.003 mL/g and at most 0.015 mL/g.

Even if the total of the pore volume of the pores having pore diameters of from 0.3 to 2 μm and the pore volume of pores having pore diameters of less than 0.3 μm, i.e. the pore volume of pores having pore diameters of at most 2 μm is large, the influence over the fillability of a lithium manganese oxide obtainable by using such a trimanganese tetraoxide as a material is small. Accordingly, the trimanganese tetraoxide of the present invention may have a pore volume of pores having pore diameters of at most 2 μm of larger than 0.1 mL/g, further at least 0.2 mL/g. On the other hand, the pore volume of pores having pore diameters of at most 2 μm should not be higher than necessary. Thus, the pore volume of pores having pore diameters of at most 2 μm may, for example, be at most 0.52 mL/g, further at most 0.4 mL/g, still further at most 0.3 mL/g.

The larger the pore volume of pores having pore diameters of from 0.5 to 1 μm, the more the fusion tends to be suppressed. Thus, the trimanganese tetraoxide of the present invention has a pore volume of pores having pore diameters of from 0.5 to 1 μm of preferably at least 0.03 mL/g, more preferably at least 0.04 mL/g, further preferably at least 0.05 mL/g, still further preferably at least 0.06 mL/g, particularly preferably at least 0.08 mL/g. On the other hand, with a view to suppressing a decrease in the fillability of the trimanganese tetraoxide and a lithium manganese oxide obtainable by using such a trimanganese tetraoxide as a material, the pore volume of pores having pore diameters of from 0.5 to 1 μm is preferably at most 0.2 mL/g, more preferably at most 0.16 mL/g, further preferably at most 0.12 mL/g.

In the trimanganese tetraoxide of the present invention, pores having pore diameters larger than 2 μm may be present. In such a case, the most frequent pore size of the trimanganese tetraoxide of the present invention is at least 1.5 μm, further at least 2 μm. On the other hand, if the pore volume of pores having large pore diameters, for example, pores having pore diameters of at least 5 μm, is increased, the fillability of such a trimanganese tetraoxide tends to be low. Accordingly, the most frequent pore size of the trimanganese tetraoxide of the present invention is preferably at most 5 μm, more preferably at most 4.5 μm, further preferably at most 4 μm. The most frequent pore size of the trimanganese tetraoxide of the present invention is particularly preferably from 2 to 4.5 μm.

Further, the larger the pore volume in the trimanganese tetraoxide, the lower the fillability of the trimanganese tetraoxide and a lithium manganese oxide obtainable by using it as a material tends to be. Thus, the total pore volume of the trimanganese tetraoxide of the present invention is preferably at most 1.5 mL/g, more preferably at most 1.1 mL/g, further preferably at most 0.9 mL/g.

The specific surface area of the trimanganese tetraoxide of the present invention is preferably at least 2 m$^2$/g, more preferably at least 2.5 m$^2$/g, further preferably at least 3 m$^2$/g, still further preferably at least 3.5 m$^2$/g, particularly preferably at least 4 m$^2$/g. When the specific area is at least 2.5 m$^2$/g, the fusion is less likely to occur. Further, when the specific surface area is at most 10 m$^2$/g, further at most 9 m²/g, the fillability of the trimanganese tetraoxide and a lithium manganese oxide using it as a material is less likely to be lowered. The specific surface area of the trimanganese tetraoxide of the present invention is particularly preferably from 2.5 to 9 m²/g.

The specific surface area may be measured, for example, by a nitrogen adsorption method such as a BET specific surface area measuring method.

With a view to increasing battery performances, particularly charge and discharge cycle life and rate capability of a lithium manganese oxide using the trimanganese tetraoxide of the present invention as a material, the average particle size of the trimanganese tetraoxide of the present invention is preferably at least 1 µm, more preferably at least 3 µm, further preferably at least 5 µm, still further preferably at least 8 µm, and preferably at least 10 µm. On the other hand, the upper limit of the average particle size is preferably at most 50 µm, more preferably at most 20 µm. The average particle size of the trimanganese tetraoxide of the present invention is particularly preferably from 8 to 20 µm.

The crystal structure of the trimanganese tetraoxide is a spinel structure. This crystal structure is a structure showing an X-ray diffraction pattern similar to No. 24-734 X-ray diffraction pattern of the JCPDS pattern.

The trimanganese tetraoxide is represented by a chemical formula $Mn_3O_4$. Thus, the ratio of oxygen to manganese in the trimanganese tetraoxide (i.e. oxygen (O)/manganese (Mn); hereinafter referred to as "x") is x=1.33 to 1.34, and such is represented by a chemical formula $MnO_{1.33-1.34}$. However, so long as the trimanganese tetraoxide has the above crystal structure i.e. a spinel structure, x in the trimanganese tetraoxide of the present invention may be x=1.2 to 1.4 (that is, a chemical formula of $MnO_{1.2-1.4}$, further x=1.25 to 1.4 (that is, a chemical formula of $MnO_{1.25-1.4}$), stir further x=1.3 to 1.4 (that is, a chemical formula of $MnO_{1.3-1.4}$).

Now, the process for producing the trimanganese tetraoxide of the present invention will be described.

So long as the trimanganese tetraoxide of the present invention has the above pores, its production process is optional. For example, the trimanganese tetraoxide of the present invention may be obtained by a process for producing trimanganese tetraoxide, which comprises a crystallization step of crystallizing trimanganese tetraoxide from a manganese salt aqueous solution not by means of manganese hydroxide, wherein in the crystallization step, the manganese salt aqueous solution and an alkali solution are mixed to obtain a slurry in which trimanganese tetraoxide is crystallized, and the trimanganese tetraoxide is crystallized so that the solid content concentration of the trimanganese tetraoxide in the slurry is higher 2 wt % and the average retention time of the trimanganese tetraoxide in the slurry is at most 10 hours (hereinafter referred to as "high concentration method").

Otherwise, the trimanganese tetraoxide of the present invention may be obtained by a process for producing trimanganese tetraoxide, which comprises a crystallization step of crystallizing trimanganese tetraoxide from a manganese salt aqueous solution not by means of manganese hydroxide, wherein in the crystallization step, the manganese salt aqueous solution and an alkali solution are mixed to obtain a slurry in which trimanganese tetraoxide is crystallized, and the trimanganese tetraoxide is crystallized so that the solid content concentration of the trimanganese tetraoxide in the slurry is at most 2 wt % (hereinafter referred to as "low concentration method").

In the crystallization step, trimanganese tetraoxide is crystallized from a manganese salt aqueous solution not by means of manganese hydroxide. Crystallization of trimanganese tetraoxide from a manganese salt aqueous solution not by means of manganese hydroxide includes an embodiment such that a crystal phase of manganese hydroxide does not form at all and an embodiment such that fine crystals of manganese hydroxide are precipitated in a short time and then they are converted to trimanganese tetraoxide before they grow into hexagonal plate-form crystals. That is, the process for producing the trimanganese tetraoxide of the present invention is characterized in that in the crystallization step, hexagonal plate-form crystals of manganese hydroxide will not form. Whether hexagonal plate-form crystals of manganese hydroxide formed or not can be judged by observing the crystal shape of the obtained trimanganese tetraoxide.

The crystallization step does not have a step of precipitating manganese hydroxide crystals from the manganese salt aqueous solution in an alkaline region and oxidizing the manganese hydroxide with an oxidizing agent (hereinafter referred to as oxidizing step). That is, in the crystallization step, trimanganese tetraoxide is crystallized without precipitating manganese hydroxide crystals from the manganese salt aqueous solution in an alkaline region. Thus, by the crystallization step in the process for producing the trimanganese tetraoxide of the present invention, the trimanganese tetraoxide can be produced without an oxidizing step.

In the crystallization step, the manganese salt aqueous solution and an alkali aqueous solution are mixed to obtain a slurry in which trimanganese tetraoxide is crystallized. Thus, the trimanganese tetraoxide can be obtained without changing the reaction atmosphere in the crystallization step. Thus, in the crystallization step, the trimanganese tetraoxide can be continuously produced by mixing the manganese salt aqueous solution and an alkali aqueous solution.

As the manganese salt aqueous solution, at least one member selected from the group consisting of manganese sulfate, manganese chloride, manganese nitrate and manganese acetate, or metal manganese, manganese oxide or the like dissolved in an acid aqueous solution of e.g. sulfuric acid, hydrochloric acid, nitric acid or acetic acid, may be used.

The manganese ion concentration of the manganese salt aqueous solution may, for example, be at least 1 mol/L.

The alkali aqueous solution is an aqueous solution showing alkalinity, and is preferably an aqueous solution showing alkalinity and having no complexing function. The alkali aqueous solution may, for example, be an aqueous solution of e.g. sodium hydroxide or potassium hydroxide.

The concentration of the alkali aqueous solution may, for example, be at least 0.1 mol/L.

In the crystallization step, the method of mixing the manganese aqueous solution and the alkali aqueous solution is optional so long as the manganese aqueous solution and the alkali aqueous solution are mixed so that the solid content concentration of the slurry in which the trimanganese tetraoxide is crystallized is within the range of the present invention.

As the mixing method, a method of adding the alkali aqueous solution to the manganese salt aqueous solution for mixing, or a method of adding the manganese salt aqueous solution and the alkali aqueous solution to a solvent such as pure water or a slurry for mixing may, for example, be mentioned. In order that the manganese salt aqueous solution and the alkali aqueous solution are sufficiently and uniformly reacted, the mixing method is preferably a method of mixing the manganese salt aqueous solution and the alkali aqueous solution to a solvent.

In the crystallization step by the low concentration method, the manganese salt aqueous solution and the alkali solution are mixed to obtain a slurry in which trimanganese tetraoxide is crystallized, and the solid content concentration of the trimanganese tetraoxide in the slurry (hereinafter sometimes referred to simply as "solid content concentration") is preferably at most 2 wt %, more preferably at most 1 wt %, whereby the trimanganese tetraoxide of the present invention will be obtained substantially no influence of the oxidation-reduction potential relative to the standard hydrogen electrode (hereinafter referred to simply as "oxidation-reduction potential") and the average retention time. Thus, the conditions under which the trimanganese tetraoxide can be crystallized will be broader. Further, in the crystallization step by the low concentration method, the solid content concentration of the trimanganese tetraoxide in the slurry is preferably at least 0.1 wt %.

In the crystallization step by the high concentration method, the manganese salt aqueous solution and the alkali solution are mixed to obtain a slurry in which the trimanganese tetraoxide is crystallized, and the solid content concentration of the trimanganese tetraoxide in the slurry is preferably higher than 2 wt %, more preferably at least 3 wt %, further preferably at least 5 wt %. The trimanganese tetraoxide of the present invention will be obtained more efficiently by the solid content concentration being within such a range and the average retention time being within the following range. Further, in the crystallization step by the high concentration method, the solid content concentration of the trimanganese tetraoxide in the slurry is preferably at most 30 wt %.

Here, the solid content concentration is determined by the weight of the trimanganese tetraoxide contained in the slurry in which the trimanganese tetraoxide is crystallized obtained by mixing the manganese salt aqueous solution and the alkali solution, based on the weight of the slurry. For example, the solid content concentration may be measured by the following method. Part of the reaction slurry containing the trimanganese tetraoxide is collected during the crystallization step, and the weight of the collected reaction slurry is measured. Then, the slurry is subjected to filtration, washed with water and dried to obtain a dry powder of the trimanganese tetraoxide. The weight of the obtained dry powder is measured, and the solid content concentration is obtained from the following formula.

Solid content concentration (wt %)=(dry powder weight (g)/reaction slurry weight (g))×100

In the crystallization step, the average time over which the crystallized trimanganese tetraoxide stays in the reaction slurry (hereinafter referred to as "average retention time") is preferably at least 1 hour. By the average retention time being within such a range, the trimanganese tetraoxide of the present invention is likely to be obtained.

In the high concentration method, if the average retention time is long, the pore volume of the obtainable trimanganese tetraoxide tends to be small. Thus, in the crystallization step by the high concentration method, the average retention time is at most 10 hours, preferably at most 8 hours, more preferably at most 6 hours, further preferably at most 4 hours, still further preferably at most 2.5 hours.

On the other hand, in the low concentration method, the shorter the average retention time, the higher the yield of the trimanganese tetraoxide per unit time and unit volume. Accordingly, the average retention time in the crystallization step by the low concentration method is preferably at most 10 hours, more preferably at most 8 hours, particularly preferably at most 2.5 hours.

The average retention time is an average time over which the trimanganese tetraoxide crystallized from the manganese salt aqueous solution stays in the reaction slurry, and for example, a time over which the trimanganese tetraoxide is crystallized at the desired solid content concentration of the reaction slurry may be taken as the average retention time.

In the crystallization step, the pH of the manganese salt aqueous solution when the trimanganese tetraoxide is crystallized is preferably pH at which manganese hydroxide hardly forms, more preferably at least pH 6 and at most pH 9, further preferably at least pH 6.5 and at most pH 8. Manganese hydroxide is less likely to form when the pH of the manganese salt aqueous solution is within such a range.

In the crystallization step, the pH of the manganese salt aqueous solution when the trimanganese tetraoxide is crystallized is within such a range, and it is further preferred that the pH is maintained constant. To maintain the pH constant means that the change in pH is ±0.5, preferably the change in pH is ±0.3, further preferably the change in pH is ±0.1.

In the crystallization step, by the oxidation-reduction potential when the trimanganese tetraoxide is crystallized being high, a single phase of the trimanganese tetraoxide is likely to be obtained. Accordingly, the oxidation-reduction potential in the crystallization step is at most 300 mV, further at most 200 mV, whereby a single phase trimanganese tetraoxide is more likely to be obtained.

In the crystallization step by the high concentration method, the oxidation-reduction potential is preferably at least 100 mV, more preferably at least 140 mV. By the oxidation-reduction potential being within such a range, the trimanganese tetraoxide of the present invention is obtained.

In the crystallization step by the high concentration method, the oxidation-reduction potential is particularly preferably from 100 to 300 mV.

On the other hand, in the crystallization step by the low concentration method, the trimanganese tetraoxide having a pore volume of the present invention will be obtained even if the oxidation-reduction potential is low. Accordingly, in the crystallization step by the low concentration method, the trimanganese tetraoxide of the present invention will be obtained, for example, when the oxidation-reduction potential is at least −100 mV, further at least −50 mV, still further at least 0 mV. In the crystallization step by the low concentration method, the oxidation-reduction potential is particularly preferably from −100 to 200 mV.

It is further preferred that the oxidation-reduction potential of the manganese salt aqueous solution is maintained constant within the above range. To maintain the oxidation-reduction potential constant means that the oxidation-reduction potential is maintained with a change within a range of ±50 mV, preferably within a range of ±30 mV, further preferably within a range of ±20 mV.

In the crystallization step, the trimanganese tetraoxide is crystallized at a temperature of preferably at least 40° C., more preferably at least 50° C., further preferably at least 60° C., and preferably at most 95° C., more preferably at most 90° C. By the temperature of the manganese salt aqueous solution at the time of crystallization being within such a range, not only crystallization of the trimanganese tetraoxide is accelerated but also the trimanganese tetraoxide tends to be particles having uniform particle sizes.

In the crystallization step, crystallization is carried out preferably by using an oxidizing agent. The oxidizing agent may, for example, be a gaseous oxidizing agent such as an oxygen-containing gas such as the air, or a liquid oxidizing agent such as hydrogen peroxide. From the industrial viewpoint, it is preferred to use as the oxidizing agent a gaseous oxidizing agent, more preferably the air.

In the crystallization step, crystallization is carried out preferably in the absence of a complexing agent. The complexing agent means ammonia, an ammonium salt, hydrazine or EDTA, or one having the same complexing ability as those.

Such a complexing agent influences the trimanganese tetraoxide crystallization behavior. Accordingly, trimanganese tetraoxide obtained in the presence of a complexing agent tends to have pore characteristics different from those of the trimanganese tetraoxide obtained by the production process of the present invention.

The trimanganese tetraoxide of the present invention may be used as a manganese material of a lithium manganese oxide.

Now, a process for producing a lithium manganese oxide using the trimanganese tetraoxide of the present invention as a manganese material will be described.

The process for producing a lithium manganese oxide of the present invention comprises a mixing step of mixing the above trimanganese tetraoxide with at least one of lithium and a lithium compound, and a heating step of subjecting the mixture to heat treatment.

In the mixing step, the mixing method may be optional but is preferably dry mixing, whereby the fusion is more likely to be suppressed. As the dry mixing method, for example, a mixing method by grinding force using e.g. a mortar or an automatic mortar, or a mixing method by shearing force using e.g. a vertical granulator may, for example, be mentioned.

In the mixing method, when the trimanganese tetraoxide is mixed with a lithium compound, another metal compound may be added so as to improve the performances of the lithium manganese oxide as a lithium secondary battery cathode material. Such another metal compound has a metal element different from manganese and lithium as a constituting element. For example, it is a compound containing as a constituting element at least one member selected from the group consisting of Al, Mg, Ni, Co, Cr, Ti and Zr.

In the heating step, the heat treatment method is optional. As the heat treatment method, firing in an oxidizing atmosphere such as in an oxidizing gas or in the air at a temperature of at least 500° C. and at most 900° C. for at least 5 hours may, for example, be mentioned.

The lithium manganese oxide obtained by using the trimanganese tetraoxide of the present invention as a manganese material undergoes substantially no fusion. Accordingly, the trimanganese tetraoxide of the present invention and a lithium manganese oxide obtained by using it as a material have substantially the same average particle size. For example, the average particle size of the lithium manganese oxide obtained by using the trimanganese tetraoxide of the present invention as a material to the average particle size of the trimanganese tetraoxide of the present invention (hereinafter referred to as "particle size ratio") is at most 1.5, preferably at most 1.2, more preferably at most 1.15, further preferably at most 1.1. On the other hand, in the heating step, the trimanganese tetraoxide shrinks in some cases, and the particle size ratio is at least 0.9, further at least 0.95.

The lithium manganese oxide after the heat treatment undergoes substantially no fusion, i.e. so-called necking. Accordingly, in the process for producing a lithium manganese oxide of the present invention, a grinding step or a pulverization step is not essential.

On the other hand, the lithium manganese oxide after the heat treatment may be in a state where the particles are physically in contact with one another, i.e. in a so-called loosely agglomerated state. When the lithium manganese oxide is used as a secondary battery cathode material, the loosely agglomerated particles are easily collapsed. Thus, the lithium manganese oxide may be in the loosely agglomerated state, but as the case requires, a step of disintegrating the loosely agglomerated particles, such as sieving, may be conducted after the heating step.

The crystal structure of the lithium manganese oxide is preferably a spinel structure. The lithium manganese oxide is represented by the following chemical formula (1):

$$Li_{1+x}M_yMn_{2-x-y}O_4 \qquad (1)$$

In the above formula (1), M is at least one metal element selected from the group consisting of elements other than Li, Mn and O, and x and y respectively satisfy the following formulae (2) and (3):

$$0 \leq x \leq 0.33 \qquad (2)$$

$$0 \leq y \leq 1.0 \qquad (3)$$

The lithium compound may be any compound. The lithium compound may, for example, be lithium hydroxide, lithium oxide, lithium carbonate, lithium iodide, lithium nitrate, lithium oxalate or an alkyllithium. A preferred lithium compound may, for example, be at least one member selected from the group consisting of lithium hydroxide, lithium oxide and lithium carbonate.

The lithium manganese oxide obtained by using the trimanganese tetraoxide of the present invention as a material may be used as a cathode active material of a lithium ion secondary battery.

EXAMPLES

Now, the present invention will be described with reference to specific Examples. However, the present invention is by no means restricted to such specific Examples.

(Pore Volume)

To measure the volume, a commercially available mercury porosimeter (tradename: AUTO PORE IV, manufactured by MICRO MERITICS) was used. The pore volume of the sample was measured within a pressure range of from the atmospheric pressure to 414 MPa. The range of pore diameters measurable within such a pressure range is at least 0.003 μm and at most 400 μm.

(Average Particle Size)

To measure the average particle size, a commercially available particle size measuring apparatus (tradename: MICROTRAC HRA 9320-X100, manufactured by Nikkiso Co., Ltd.) was used. The sample was dispersed in pure water and ammonia water was added thereto to adjust the pH to be 8.5 thereby to prepare a measurement solution. The measurement solution was subjected to ultrasonic dispersion for 3 minutes, and then the average particle size was measured.

(BET Specific Surface Area)

The BET specific surface area was measured by nitrogen adsorption by a single point BET method using a commercially available specific surface area measuring apparatus (tradename: FLOW SORB III, manufactured by MICRO METRICS). Prior to the measurement of the BET specific surface area, the sample was heated in a stream of the air at 150° C. for 40 minutes for deaeration.

(Tap Density)

The density was measured in accordance with JIS R1628 and taken as the tap density.

(Press Density)

1 g of the sample was packed in a mold having a diameter of 13 mm and pressed under 1 t/cm² to obtain a molded product. The density obtained by dividing the weight of the obtained molded product by its volume was taken as the press density.

(X-Ray Diffraction Measurement)

The crystal phase of a sample was measured by a X-ray diffraction. For measurement, a conventional X-ray diffraction apparatus was used. Measurement was carried out using CuKα radiation (λ=1.5405 Å) as the light source with a step scanning as the measurement mode under scanning conditions of 0.04° per second for a measuring time of 3 seconds within a measurement range 2θ of from 5° to 80°.

The crystal phase of the sample was identified by comparing the X-ray diffraction pattern of the sample with No. 24734 X-ray diffraction pattern of the JCPDS pattern which was taken as the X-ray diffraction pattern of the trimanganese tetraoxide having a spinel structure and with No. 35-782 X-ray diffraction pattern of the JCPDS pattern which was taken as the X-ray diffraction pattern of lithium manganate.

(Measurement of Solid Content Concentration)

The solid content concentration was measured during the crystallization reaction as follows. During the crystallization reaction, part of the reaction slurry containing manganese oxide was collected. The weight of the collected reaction slurry was measured, and then the reaction slurry was subjected to filtration, washed with water and dried at 110° C. to obtain a dry powder of manganese oxide. The weight of the obtained dry powder was measured, and the solid content concentration was obtained from the following formula:

Solid content concentration (wt %)=(dry powder weight (g)/reaction slurry weight (g))×100

Example 1

Production of Trimanganese Tetraoxide

Pure water at 80° C. was stirred while blowing the air so that the oxidation-reduction potential would be 200 mV. A 2 mol/L manganese sulfate aqueous solution and a 2.8 mol/L sodium hydroxide aqueous solution were continuously added thereto to crystallize manganese oxide thereby to obtain a reaction slurry having a solid content concentration of 5.4 wt %.

The sodium hydroxide aqueous solution was properly added to the reaction slurry so that the pH of the reaction slurry would be 7.

Simultaneously with addition of the manganese sulfate aqueous solution and the sodium hydroxide aqueous solution to the reaction slurry, while the solid content concentration was maintained, the reaction slurry in the same amount as the added aqueous solutions was withdrawn and crystallization was carried out for 4 hours. Thus, crystallization was carried out with an average retention time of manganese oxide in the slurry of 4 hours. Then, the reaction slurry was subjected to filtration, washed and dried to obtain manganese oxide.

The crystal phase of the obtained manganese oxide was a spinel structure. Further, the degree of oxidation of manganese of the manganese oxide was x=1.33 (MnO$_{1.33}$). From these results, the obtained manganese oxide was confirmed to have a trimanganese tetraoxide single phase.

(Production of Lithium Manganate)

The obtained trimanganese tetraoxide and lithium carbonate were mixed by dry mixing in a mortar in a molar ratio of 2Li/Mn=1.16 to obtain a mixture. The obtained mixture was fired at 850° C. for 6 hours to obtain a lithium manganese oxide.

The crystal phase of the obtained lithium manganese oxide was a lithium manganate single phase, and the lattice constant was 8.215 Å.

The results of evaluation of the trimanganese tetraoxide in Example 1 are shown in Table 1, and the results of evaluation of the lithium manganate are shown in Table 2.

Example 2

Production of Trimanganese Tetraoxide

A manganese oxide was obtained in the same manner as in Example 1 except that the oxidation-reduction potential was 0 mV, the pH of the reaction slurry was 8, the concentration of the sodium hydroxide aqueous solution was 0.25 mol/L, the solid content concentration of the reaction slurry was 0.9 wt %, and the average retention time of the manganese oxide in the slurry was 2.25 hours.

The crystal phase of the obtained manganese oxide was a spinel structure. Further, the degree of oxidation of manganese of the manganese oxide was x=1.33 (MnO$_{1.33}$). From these results, the obtained manganese oxide was confirmed to have a trimanganese tetraoxide single phase.

(Production of Lithium Manganate)

A lithium manganese oxide was obtained in the same manner as in Example 1 except that the obtained trimanganese tetraoxide was used.

The crystal phase of the obtained lithium manganese oxide was a lithium manganate single phase, and the lattice constant was 8.220 Å.

The results of evaluation of the trimanganese tetraoxide in Example 2 are shown in Table 1, and the results of evaluation of the lithium manganate are shown in Table 2.

Example 3

Production of Trimanganese Tetraoxide

A manganese oxide was obtained in the same manner as in Example 1 except that the average retention time of the manganese oxide in the slurry was 8 hours.

The crystal phase of the obtained manganese oxide was a spinel structure. Further, the degree of oxidation of manganese of the manganese oxide was x=1.33 (MnO$_{1.33}$). From these results, the obtained manganese oxide was confirmed to have a trimanganese tetraoxide single phase. The tap density of the trimanganese tetraoxide in Example 3 was 1.4 g/cm³.

(Production of Lithium Manganate)

A lithium manganese oxide was obtained in the same manner as in Example 1 except that the obtained trimanganese tetraoxide was used.

The crystal phase of the obtained lithium manganese oxide was a lithium manganate single phase, and the lattice constant was 8.218 Å.

The results of evaluation of the trimanganese tetraoxide in Example 3 are shown in Table 1, and the results of evaluation of the lithium manganate are shown in Table 2.

Example 4

Production of Trimanganese Tetraoxide

A manganese oxide was obtained in the same manner as in Example 1 except that the oxidation-reduction potential was 100 mV, the concentration of the sodium hydroxide aqueous solution was 0.25 mol/L, the solid content concentration of the slurry was 0.9 wt %, and the average retention time of the manganese oxide in the slurry was 2.25 hours.

The crystal phase of the obtained manganese oxide was a spinet structure. Further, the degree of oxidation of manganese of the manganese oxide was x=1.33 ($MnO_{1.33}$). From these results, the obtained manganese oxide was confirmed to have a trimanganese tetraoxide single phase.

(Production of Lithium Manganate)

A lithium manganese oxide was obtained in the same manner as in Example 1 except that the obtained trimanganese tetraoxide was used.

The crystal phase of the obtained lithium manganese oxide was a lithium manganate single phase, and the lattice constant was 8.218 Å.

The results of evaluation of the trimanganese tetraoxide in Example 4 are shown in Table 1, and the results of evaluation of the lithium manganate are shown in Table 2.

Example 5

Production of Trimanganese Tetraoxide

A manganese oxide was obtained in the same manner as in Example 1 except that the oxidation-reduction potential was −50 mV, the pH of the reaction slurry was 8.5, the concentration of the sodium hydroxide aqueous solution was 0.25 mol/L, the solid content concentration of the slurry was 0.9 wt %, and the average retention time of the manganese oxide in the slurry was 2.25 hours.

The crystal phase of the obtained manganese oxide was a spinel structure. Further, the degree of oxidation of manganese of the manganese oxide was x=1.33 ($MnO_{1.33}$). From these results, the obtained manganese oxide was confirmed to have a trimanganese tetraoxide single phase.

(Production of Lithium Manganate)

A lithium manganese oxide was obtained in the same manner as in Example 1 except that the obtained trimanganese tetraoxide was used.

The crystal phase of the obtained lithium manganese oxide was a lithium manganate single phase, and the lattice constant was 8.217 Å.

The results of evaluation of the trimanganese tetraoxide in Example 5 are shown in Table 1, and the results of evaluation of the lithium manganate are shown in Table 2.

Example 6

Production of Trimanganese Tetraoxide

A manganese oxide was obtained in the same manner as in Example 1 except that the oxidation-reduction potential was 140 mV, the pH of the reaction slurry was 7.4, the concentration of the sodium hydroxide aqueous solution was 0.13 mol/L, the solid content concentration of the slurry was 3.4 wt %, and the average retention time of the manganese oxide in the slurry was 4 hours.

The crystal phase of the obtained manganese oxide was a spinel structure. Further, the degree of oxidation of manganese of the manganese oxide was x=1.33 ($MnO_{1.33}$). From these results, the obtained manganese oxide was confirmed to have a trimanganese tetraoxide single phase.

(Production of Lithium Manganate)

A lithium manganese oxide was obtained in the same manner as in Example 1 except that the obtained trimanganese tetraoxide was used.

The crystal phase of the obtained lithium manganese oxide was a lithium manganate single phase, and the lattice constant was 8.215 Å.

The results of evaluation of the trimanganese tetraoxide in Example 6 are shown in Table 1, and the results of evaluation of the lithium manganate are shown in Table 2.

Example 7

Production of Trimanganese Tetraoxide

Pure water at 90° C. was stirred while blowing the air so that the oxidation-reduction potential would be 200 mV. A 2 mol/L manganese sulfate aqueous solution and a 2.5 mol/L sodium hydroxide aqueous solution were continuously added thereto to crystallize manganese oxide thereby to obtain a reaction slurry having a solid content concentration of 2.2 wt %.

When the solid content concentration reached 2.2 wt %, addition of the manganese sulfate aqueous solution and the sodium hydroxide aqueous solution was stopped, and the solid content concentration was maintained. Stirring was continued further for 6 hours, so that the average retention time of manganese oxide in the reaction slurry was 6 hours. Then, the reaction slurry was subjected to filtration, washed and dried to obtain manganese oxide.

The crystal phase of the obtained manganese oxide was a spinel structure. Further, the degree of oxidation of manganese of the manganese oxide was x=1.33 ($MnO_{1.33}$). From these results, the obtained manganese oxide was confirmed to have a trimanganese tetraoxide single phase.

(Production of Lithium Manganate)

A lithium manganese oxide was obtained in the same manner as in Example 1 except that the obtained trimanganese tetraoxide was used.

The crystal phase of the obtained lithium manganese oxide was a lithium manganate single phase, and the lattice constant was 8.216 Å.

The results of evaluation of the trimanganese tetraoxide in Example 7 are shown in Table 1, and the results of evaluation of the lithium manganate are shown in Table 2.

Example 8

Production of Trimanganese Tetraoxide

A manganese oxide was obtained in the same manner as in Example 7 except that the temperature of the pure water was 80° C., and the oxidation-reduction potential was 150 mV.

The crystal phase of the obtained manganese oxide was a spinel structure. Further, the degree of oxidation of manganese of the manganese oxide was x=1.33 ($MnO_{1.33}$). From these results, the obtained manganese oxide was confirmed to have a trimanganese tetraoxide single phase.

(Production of Lithium Manganate)

A lithium manganese oxide was obtained in the same manner as in Example 1 except that the obtained trimanganese tetraoxide was used.

The crystal phase of the obtained lithium manganese oxide was a lithium manganate single phase, and the lattice constant was 8.219 Å.

The results of evaluation of the trimanganese tetraoxide in Example 8 are shown in Table 1, and the results of evaluation of the lithium manganate are shown in Table 2.

Example 9

Production of Trimanganese Tetraoxide

A manganese oxide was obtained in the same manner as in Example 7 except that the oxidation-reduction potential was 200 mV.

The crystal phase of the obtained manganese oxide was a spinel structure. Further, the degree of oxidation of manganese of the manganese oxide was x=1.33 ($MnO_{1.33}$). From these results, the obtained manganese oxide was confirmed to have a trimanganese tetraoxide single phase.

(Production of Lithium Manganate)

A lithium manganese oxide was obtained in the same manner as in Example 1 except that the obtained trimanganese tetraoxide was used.

The crystal phase of the obtained lithium manganese oxide was a lithium manganate single phase, and the lattice constant was 8.216 Å.

The results of evaluation of the trimanganese tetraoxide in Example 9 are shown in Table 1, and the results of evaluation of the lithium manganate are shown in Table 2.

Comparative Example 1

Production of Trimanganese Tetraoxide

A manganese oxide was obtained in the same manner as in Example 1 except that the oxidation-reduction potential was 100 mV, and the average retention time of the manganese oxide in the slurry was 18 hours.

The crystal phase of the obtained manganese oxide was a spinel structure. Further, the degree of oxidation of manganese of the manganese oxide was x=1.33 ($MnO_{1.33}$). From these results, the obtained manganese oxide was confirmed to have a trimanganese tetraoxide single phase. The tap density of the trimanganese tetraoxide in Comparative Example 1 was 1.77 $g/cm^3$.

(Production of Lithium Manganate)

A lithium manganese oxide was obtained in the same manner as in Example 1 except that the obtained trimanganese tetraoxide was used.

The crystal phase of the obtained lithium manganese oxide was a lithium manganate single phase, and the lattice constant was 8.216 Å.

The results of evaluation of the trimanganese tetraoxide in Comparative Example 1 are shown in Table 1, and the results of evaluation of the lithium manganate are shown in Table 2.

Comparative Example 2

Production of Trimanganese Tetraoxide

A manganese oxide was obtained in the same manner as in Example 1 except that the oxidation-reduction potential was 180 mV, and the average retention time of the manganese oxide in the slurry was 18 hours.

The crystal phase of the obtained manganese oxide was a spinel structure. Further, the degree of oxidation of manganese of the manganese oxide was x=1.33 ($MnO_{1.33}$). From these results, the obtained manganese oxide was confirmed to have a trimanganese tetraoxide single phase. The tap density of the trimanganese tetraoxide in Comparative Example 2 was 1.77 $g/cm^3$.

(Production of Lithium Manganate)

A lithium manganese oxide was obtained in the same manner as in Example 1 except that the obtained trimanganese tetraoxide was used.

The crystal phase of the obtained lithium manganese oxide was a lithium manganate single phase, and the lattice constant was 8.216 Å.

The results of evaluation of the trimanganese tetraoxide in Comparative Example 2 are shown in Table 1, and the results of evaluation of the lithium manganate are shown in Table 2.

TABLE 1

| | Pore volume (mL/g) | | | | | | | |
| --- | --- | --- | --- | --- | --- | --- | --- | --- |
| | Pores having pore diameters of at most 2 μm | Pores having pore diameters of less than 0.3 μm | Pores having pore diameters of from 0.3 to 2 μm | Pores having pore diameters of from 0.5 to 1 μm | Total pore volume (mL/g) | Most frequent pore size (μm) | BET specific surface area ($m^2/g$) | Average particle size (μm) |
| Example 1 | 0.214 | 0.007 | 0.207 | 0.062 | 0.687 | 2.54 | 3.5 | 9.1 |
| Example 2 | 0.250 | 0.004 | 0.246 | 0.094 | 0.768 | 4.02 | 2.9 | 14.0 |
| Example 3 | 0.228 | 0.015 | 0.213 | 0.116 | 0.528 | 3.68 | 3.2 | 15.7 |
| Example 4 | 0.092 | 0.006 | 0.273 | 0.070 | 1.015 | 3.73 | 4.2 | 16.3 |
| Example 5 | 0.212 | 0.011 | 0.389 | 0.156 | 0.816 | 2.04 | 8.4 | 12.1 |
| Example 6 | 0.094 | 0.008 | 0.112 | 0.043 | 0.391 | 3.51 | 3.4 | 11.8 |
| Example 7 | 0.092 | 0.007 | 0.254 | 0.066 | 0.980 | 3.22 | 4.4 | 9.6 |
| Example 8 | 0.091 | 0.014 | 0.251 | 0.059 | 1.033 | 3.05 | 5.1 | 9.7 |
| Example 9 | 0.126 | 0.011 | 0.282 | 0.090 | 0.776 | 2.48 | 6.0 | 10.7 |
| Comparative Example 1 | 0.041 | 0.005 | 0.093 | 0.028 | 0.472 | 3.22 | 1.5 | 10.2 |
| Comparative Example 2 | 0.037 | 0.003 | 0.096 | 0.026 | 0.430 | 4.13 | 1.6 | 13.6 |

From these Examples, of the trimanganese tetraoxide of the present invention, the pore volume of pores having pore diameters of from 0.3 to 2 μm was so large as at least 0.1 mL/g, or further at least 0.2 mL/g. Further, of the trimanganese tetraoxide of the present invention, the pore volume of pores having the above pore diameters was large regardless of the average particle size of at least 9 μm, at least 10 μm or at least 15 μm. On the other hand, the trimanganese tetraoxide of the present invention tended to have low fillability with a tap density of at most 1.4 $g/cm^3$ as compared with the trimanganese tetraoxide in each of Comparative Examples.

Further, it was confirmed that a single phase of trimanganese tetraoxide was obtained by the low concentration method even by crystallization with a low oxidation-reduction potential of the slurry of at least −50 mV.

TABLE 2

|  | Average particle size (μm) | Tap density (g/cm$^3$) | Press density (g/cm$^3$) |
|---|---|---|---|
| Example 1 | 10.2 | 1.8 | 2.7 |
| Example 2 | 14.2 | 1.6 | 2.6 |
| Example 3 | 16.0 | 1.7 | 2.7 |
| Example 4 | 17.3 | 1.3 | 2.7 |
| Example 5 | 13.3 | 1.6 | 2.7 |
| Example 6 | 13.4 | 1.9 | 2.8 |
| Example 7 | 9.7 | 1.3 | 2.4 |
| Example 8 | 10.2 | 1.3 | 2.4 |
| Example 9 | 11.8 | 1.3 | 2.5 |
| Comparative Example 1 | 19.4 | 1.8 | 2.6 |
| Comparative Example 2 | 24.2 | 1.9 | 2.8 |

The lithium manganate obtained from the trimanganese tetraoxide of the present invention had a tap density of at least 1.3 g/cm$^3$. However, the press density was so high as at least 2.4 g/cm$^3$ and at most 2.8 g/cm$^3$, and it had fillability equal to that of the trimanganese tetraoxide in each of Comparative Examples which was excellent in the fillability.

The particle size ratios in Examples and Comparative Examples are shown in Table 3.

TABLE 3

|  | Average particle size (μm) of trimanganese tetraoxide | Average particle size (μm) of lithium manganate | Particle size ratio |
|---|---|---|---|
| Example 1 | 9.1 | 10.2 | 1.12 |
| Example 2 | 14.0 | 14.2 | 1.01 |
| Example 3 | 15.7 | 16.0 | 1.02 |
| Example 4 | 16.3 | 17.3 | 1.06 |
| Example 5 | 12.1 | 13.3 | 1.10 |
| Example 6 | 11.8 | 13.4 | 1.14 |
| Example 7 | 9.6 | 9.7 | 1.01 |
| Example 8 | 9.7 | 10.2 | 1.05 |
| Example 9 | 10.7 | 11.8 | 1.10 |
| Comparative Example 1 | 10.2 | 19.4 | 1.90 |
| Comparative Example 2 | 13.6 | 24.2 | 1.78 |

From Table 3, the particle size ratio of the trimanganese tetraoxide of the present invention was at most 1.5 or further at most 1.2, and it was confirmed that no fusion occurred at the time of firing. On the other hand, the trimanganese tetraoxide in each of Comparative Examples which was excellent in the fillability underwent fusion at the time of firing, and the particle size ratio was at least 1.4 or further at least 1.7, and the particle size of the lithium manganate was almost twice the trimanganese tetraoxide.

INDUSTRIAL APPLICABILITY

The trimanganese tetraoxide of the present invention is useful for production of a lithium manganese oxide with a low production cost.

The entire disclosure of Japanese Patent Application No. 2012-221628 filed on Oct. 3, 2012 including specification, claims, drawings and summary is incorporated herein by reference in its entirety.

The invention claimed is:

1. Trimanganese tetraoxide, wherein the pore volume of pores having pore diameters of from 0.3 to 2 μm is at least 0.2 mL/g.

2. The trimanganese tetraoxide according to claim 1, wherein the pore volume of pores having pore diameters of from 0.5 to 1 μm is at least 0.03 mL/g.

3. The trimanganese tetraoxide according to claim 1, wherein the most frequent pore size is from 2 to 4.5 μm.

4. The trimanganese tetraoxide according to claim 1, wherein the specific surface area is from 2.5 to 9 m$^2$/g.

5. The trimanganese tetraoxide according to claim 1, wherein the average particle size is from 8 to 20 μm.

6. A process for producing the trimanganese tetraoxide as defined in claim 1, which comprises crystallizing trimanganese tetraoxide from a manganese salt aqueous solution not by means of manganese hydroxide, wherein in the crystallization, the manganese salt aqueous solution and an alkali solution are mixed to obtain a slurry in which trimanganese tetraoxide is crystallized, and the trimanganese tetraoxide is crystallized so that the solid content concentration of the trimanganese tetraoxide in the slurry is higher than 2 wt %, and the average retention time of the trimanganese tetraoxide in the slurry is at most 10 hours.

7. The process for producing the trimanganese tetraoxide according to claim 6, wherein in the crystallization, the oxidation-reduction potential is from 100 to 300 mV.

8. A process for producing the trimanganese tetraoxide as defined in claim 1, which comprises crystallizing trimanganese tetraoxide from a manganese salt aqueous solution not by means of manganese hydroxide, wherein in the crystallization, the manganese salt aqueous solution and an alkali solution are mixed to obtain a slurry in which trimanganese tetraoxide is crystallized, and the trimanganese tetraoxide is crystallized so that the solid content concentration of the trimanganese tetraoxide in the slurry is at most 2 wt %.

9. The process for producing the trimanganese tetraoxide according to claim 8, wherein the trimanganese tetraoxide is crystallized so that the average retention time of the trimanganese tetraoxide in the slurry is at most 10 hours.

10. The process for producing the trimanganese tetraoxide according to claim 8, wherein in the crystallization, the oxidation-reduction potential is from −100 to 200 mV.

11. A process for producing a lithium manganese oxide, which comprises a mixing step of mixing the trimanganese tetraoxide as defined in claim 1 with at least one of lithium and a lithium compound, and a heating step of subjecting the mixture to heat treatment.

12. The process for producing trimanganese tetraoxide according to claim 6, wherein the solid content of trimanganese tetraoxide in the slurry is higher than 2 wt % and at most 3.4 wt %.

* * * * *